(12) United States Patent
Nakayama et al.

(10) Patent No.: US 12,175,951 B2
(45) Date of Patent: Dec. 24, 2024

(54) IMAGING APPARATUS, AND METHOD OF CONTROLLING IMAGING APPARATUS

(71) Applicant: SONY GROUP CORPORATION, Tokyo (JP)

(72) Inventors: Katsuyuki Nakayama, Tokyo (JP); Ichiro Tsujimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 51 days.

(21) Appl. No.: 17/912,981

(22) PCT Filed: Mar. 19, 2021

(86) PCT No.: PCT/JP2021/011344
§ 371 (c)(1),
(2) Date: Sep. 20, 2022

(87) PCT Pub. No.: WO2021/200266
PCT Pub. Date: Oct. 7, 2021

(65) Prior Publication Data
US 2023/0162707 A1 May 25, 2023

(30) Foreign Application Priority Data
Mar. 30, 2020 (JP) .................. 2020-059309

(51) Int. Cl.
*G06T 15/10* (2011.01)
*G06F 3/01* (2006.01)
*G09G 5/377* (2006.01)

(52) U.S. Cl.
CPC ............ *G09G 5/377* (2013.01); *G06F 3/013* (2013.01)

(58) Field of Classification Search
CPC ...... G09G 5/377; G06F 3/013; H04N 23/611; H04N 23/675; H04N 23/635
USPC .................................................. 345/429, 427
See application file for complete search history.

(56) References Cited

U.S. PATENT DOCUMENTS

| 7,860,382 | B2 | 12/2010 | Grip |
| 9,740,282 | B1 | 8/2017 | Mcinerny |
| 2013/0187954 | A1* | 7/2013 | Saito ...................... G06T 11/60 345/634 |
| 2016/0321791 | A1* | 11/2016 | Cabrera-Cordon ..... G06F 16/29 |

(Continued)

FOREIGN PATENT DOCUMENTS

| GB | 2569429 A | 6/2019 |
| JP | 2004-178554 A | 6/2004 |
| JP | 2007-251993 A | 9/2007 |

(Continued)

OTHER PUBLICATIONS

International Search Report and Written Opinion of PCT Application No. PCT/JP2021/011344, issued on Jun. 22, 2021, 09 pages of ISRWO.

*Primary Examiner* — Gordon G Liu
(74) *Attorney, Agent, or Firm* — CHIP LAW GROUP

(57) ABSTRACT

An imaging apparatus includes a display image generation unit that performs, on the basis of a superimposition information display region for displaying superimposition information and a gaze region specified on the basis of line-of-sight information, line-of-sight correspondence display image generation processing of generating a display image in which the superimposition information and a captured image are superimposed.

17 Claims, 16 Drawing Sheets

(56) References Cited

U.S. PATENT DOCUMENTS

2019/0179511 A1* 6/2019 Shimada ................. G06F 3/011

FOREIGN PATENT DOCUMENTS

| JP | 2016-181004 A | 10/2016 |
| JP | 2016-218106 A | 12/2016 |
| JP | 2017-169167 A | 9/2017 |

* cited by examiner

| MODE | AUTO | PROGRAM | DIAPHRAGM PRIORITY | SHUTTER SPEED PRIORITY |
|---|---|---|---|---|
| LINE-OF-SIGHT CORRESPONDENCE DISPLAY IMAGE GENERATION PROCESSING | STOPPED | EXECUTED | STOPPED | EXECUTED |

FIG. 13

| MODE | AUTO | PROGRAM | DIAPHRAGM PRIORITY | | SHUTTER SPEED PRIORITY | |
|---|---|---|---|---|---|---|
| STATE OF SHUTTER BUTTON | REGARDLESS OF STATE OF SHUTTER BUTTON | REGARDLESS OF STATE OF SHUTTER BUTTON | S0 | S1 | S0 | S1 |
| LINE-OF-SIGHT CORRESPONDENCE DISPLAY IMAGE GENERATION PROCESSING | STOPPED | EXECUTED | EXECUTED | STOPPED | STOPPED | EXECUTED |

FIG. 15

| MODE | AUTO | PROGRAM | DIAPHRAGM PRIORITY | | SHUTTER SPEED PRIORITY | |
|---|---|---|---|---|---|---|
| STATE OF SHUTTER BUTTON | REGARDLESS OF STATE OF SHUTTER BUTTON | REGARDLESS OF STATE OF SHUTTER BUTTON | AF-ON S0 | S1 | AF-ON S0 | S1 |
| LINE-OF-SIGHT CORRESPONDENCE DISPLAY IMAGE GENERATION PROCESSING | STOPPED | EXECUTED | EXECUTED | STOPPED | STOPPED | EXECUTED |

…

IMAGING APPARATUS, AND METHOD OF CONTROLLING IMAGING APPARATUS

CROSS REFERENCE TO RELATED APPLICATIONS

This application is a U.S. National Phase of International Patent Application No. PCT/JP2021/011344 filed on Mar. 19, 2021, which claims priority benefit of Japanese Patent Application No. JP 2020-059309 filed in the Japan Patent Office on Mar. 30, 2020. Each of the above-referenced applications is hereby incorporated herein by reference in its entirety.

TECHNICAL FIELD

The present disclosure relates to an imaging apparatus, a method of controlling the imaging apparatus, and a program.

BACKGROUND ART

In an imaging apparatus equipped with an autofocus (AF) function, a focused place is generally displayed with a frame (hereinafter, appropriately referred to as an AF frame) such as a rectangle (see, for example, Patent Document 1). The AF frame is displayed by a so-called on screen display (OSD) superimposed on a captured image.

CITATION LIST

Patent Document

Patent Document 1: Japanese Patent Application Laid-Open No. 2016-218106

SUMMARY OF THE INVENTION

Problems to be Solved by the Invention

A point at which a user gazes in an image in imaging is generally a point desired to be imaged, but if an AF frame is displayed at the point, it is difficult for the user to confirm a subject at the point overlapping the AF frame. On the other hand, if the AF frame is not displayed, there is a problem that it becomes difficult for the user to understand whether or not it is in focus.

An object of the present disclosure is to provide an imaging apparatus capable of appropriately displaying superimposition information that is an AF frame and the like, a method of controlling the imaging apparatus, and a program.

Solutions to Problems

The present disclosure provides, for example, an imaging apparatus including a display image generation unit that performs, on the basis of a superimposition information display region for displaying superimposition information and a gaze region specified on the basis of line-of-sight information, line-of-sight correspondence display image generation processing of generating a display image in which the superimposition information and a captured image are superimposed.

Furthermore, the present disclosure provides, for example, a method of controlling an imaging apparatus, the method including causing a display image generation unit to perform, on the basis of a superimposition information display region for displaying superimposition information and a gaze region specified on the basis of line-of-sight information, line-of-sight correspondence display image generation processing of generating a display image in which the superimposition information and a captured image are superimposed.

Furthermore, the present disclosure provides, for example, a program for causing a computer to execute a control method of causing a display image generation unit to perform, on the basis of a superimposition information display region for displaying superimposition information and a gaze region specified on the basis of line-of-sight information, line-of-sight correspondence display image generation processing of generating a display image in which the superimposition information and a captured image are superimposed.

BRIEF DESCRIPTION OF DRAWINGS

FIG. 10 is a flowchart illustrating a flow of processing performed by the imaging apparatus according to the embodiment.

FIG. 11 is a diagram for explaining a first example of determining whether or not to perform line-of-sight correspondence display image generation processing according to an imaging mode and the like.

FIG. 12 is a flowchart for explaining the first example of determining whether or not to perform the line-of-sight correspondence display image generation processing according to the imaging mode and the like.

FIG. 13 is a diagram for explaining a second example of determining whether or not to perform the line-of-sight correspondence display image generation processing according to the imaging mode and the like.

FIG. 14 is a flowchart for explaining the second example of determining whether or not to perform the line-of-sight correspondence display image generation processing according to the imaging mode and the like.

FIG. 15 is a diagram for explaining a third example of determining whether or not to perform the line-of-sight correspondence display image generation processing according to the imaging mode and the like.

FIG. 16 is a flowchart for explaining the third example of determining whether or not to perform the line-of-sight correspondence display image generation processing according to the imaging mode and the like.

MODE FOR CARRYING OUT THE INVENTION

Hereinafter, embodiments and the like of the present disclosure will be described with reference to the drawings. Note that the description will be given in the following order.

First Embodiment

Second Embodiment

<Modifications>

The embodiments and the like described below are preferred specific examples of the present disclosure, and the contents of the present disclosure are not limited to these embodiments and the like.

First Embodiment

[Configuration Example of Imaging Apparatus]

Figure 1:
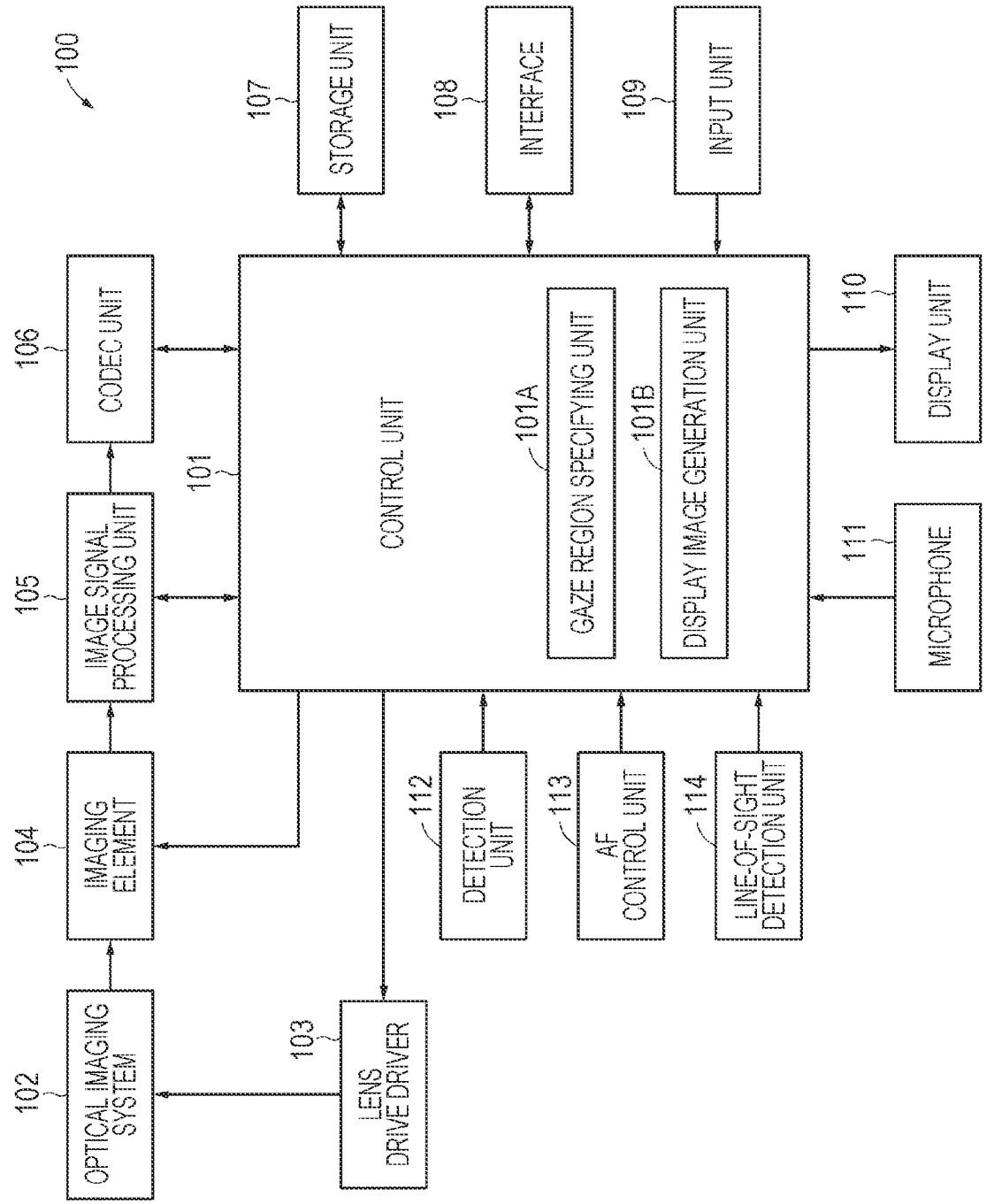
FIG. 1 is a block diagram for explaining a configuration example of an imaging apparatus according to an embodiment.

First, a configuration example of an imaging apparatus (imaging apparatus 100) according to an embodiment will be described with reference to FIG. 1. The imaging apparatus 100 includes a control unit 101, an optical imaging system 102, a lens drive driver 103, an imaging element 104, an image signal processing unit 105, a codec unit 106, a storage unit 107, an interface 108, an input unit 109, a display unit 110, a microphone 111, a detection unit 112, an AF control unit 113, and a line-of-sight detection unit 114. The control unit 101 includes a gaze region specifying unit 101A and a display image generation unit 101B as functional blocks.

The control unit 101 includes a central processing unit (CPU), a random access memory (RAM), a read only memory (ROM), and the like. The CPU executes various processes according to a program stored in the ROM and issues commands, thereby comprehensively controlling the entire imaging apparatus 100 and each of the units. The gaze region specifying unit 101A specifies a gaze region at which a user gazes on the display unit 110 on the basis of line-of-sight information. Furthermore, the display image generation unit 101B performs line-of-sight correspondence display image generation processing of generating, on the basis of a superimposition information display region for displaying superimposition information and a gaze region specified on the basis of the line-of-sight information, a display image in which the superimposition information and a captured image are superimposed. Note that details of the line-of-sight correspondence display image generation processing performed by the display image generation unit 101B will be described later.

The optical imaging system 102 includes an imaging lens for focusing light from a subject on the imaging element 104, a drive mechanism for moving the imaging lens to perform focusing and zooming, a shutter mechanism, an iris mechanism, and the like. These are driven on the basis of control signals from the control unit 101 and the lens drive driver 103. An optical image of the subject obtained through the optical imaging system 102 is formed on the imaging element 104.

The lens drive driver 103 includes, for example, a microcomputer, and moves the imaging lens by a predetermined amount along an optical axis direction on the basis of focus control information supplied from the AF control unit 113 or an information processing apparatus 200, thereby performing autofocus to focus on the target subject. Furthermore, operations of the drive mechanism, the shutter mechanism, the iris mechanism, and the like of the optical imaging system 102 are controlled under the control of the control unit 101. As a result, the exposure time (shutter speed) and the aperture value (F value) are adjusted.

The imaging element 104 photoelectrically converts light incident from the subject and obtained through the imaging lens into a charge amount and outputs an imaging signal. Then, the imaging element 104 outputs a pixel signal to the image signal processing unit 105. As the imaging element 104, a charge coupled device (CCD), a complementary metal oxide semiconductor (CMOS), or the like is used.

The imaging element 104 includes a red (R) pixel, a green (G) pixel, and a blue (B) pixel that are normal pixels, and a phase difference detection pixel that performs phase difference detection. It is possible to perform so-called phase difference autofocus (AF) using phase difference information output from the phase difference detection pixel. Note that the phase difference detection pixel may function only as a phase difference detection pixel and may not function as a normal pixel, or may function for imaging and phase difference detection as one pixel is constituted by two independent photodiodes. Note that the phase difference detection may be performed by an AF sensor dedicated to phase difference detection.

The image signal processing unit 105 performs sample-and-hold for maintaining a high signal/noise (S/N) ratio by correlated double sampling (CDS) processing, auto gain control (AGC) processing, analog/digital (A/D) conversion, and the like on the imaging signal output from the imaging element 104 to create an image signal. Furthermore, the image signal processing unit 105 performs recording processing on the image signal for recording, and performs display processing on the image signal for display.

The codec unit 106 performs encoding processing for, for example, recording and communication on the image signal subjected to the predetermined processing.

The storage unit 107 is, for example, a mass storage medium such as a hard disk or a flash memory. Video data and image data processed by the image signal processing unit 105 and the codec unit 106 are stored in a compressed state or an uncompressed state on the basis of a predetermined standard. Furthermore, an exchangeable image file format (EXIF) including additional information such as information regarding the stored data, imaging position information indicating an imaging position, and imaging time information indicating imaging date and time is also stored in association with the data.

The interface 108 is an interface with another device, the Internet, or the like. The interface 108 may include a wired or wireless communication interface. Furthermore, more specifically, the wired or wireless communication interface may include cellular communication such as 3TTE, Wi-Fi, Bluetooth (registered trademark), near field communication (NFC), Ethernet (registered trademark), High-Definition Multimedia Interface (HDMI) (registered trademark), Universal Serial Bus (USB), and the like.

Note that the imaging apparatus 100 may include a communication unit capable of connecting to the Internet, other devices, and the like, such as a wireless local area network (LAN), a wide area network (WAN), or Wireless Fidelity (WiFi). Furthermore, communication between the imaging apparatus 100 and an external device may be short-range wireless communication such as near field communication (NFC) or ZigBee (registered trademark), or tethering connection such as WiFi tethering, Universal Serial Bus (USB) tethering, or Bluetooth (registered trademark) tethering.

The input unit 109 is used by the user to give various instructions to the imaging apparatus 100. When an input is made to the input unit 109 by the user, a control signal corresponding to the input is generated and supplied to the control unit 101. Then, the control unit 101 performs various processes corresponding to the control signal. Examples of the input unit 109 include a shutter button for shutter input, physical buttons for various operations, a touch panel, a touch screen integrally configured with a display as the display unit 110, and the like.

The display unit 110 is a display device such as a display that displays a through image which is a display image signal subjected to display processing, an image/video subjected to recording image processing and stored in the storage unit 107, a graphical user interface (GUI), and the like.

The microphone 111 is a sound collecting device for recording sound at the time of recording.

The detection unit 112 executes AF detection for determining a focus position using the phase difference information supplied from the imaging element 104 and calculates a defocus amount. The defocus amount is supplied to the AF control unit 113.

The AF control unit 113 generates focus control information indicating which position (for example, XY coordinate information) in the angle of view is focused and how much the lens drive driver 103 of the imaging apparatus 100 moves the lens so as to focus on the target subject on the basis of the defocus amount calculated by the detection unit 112. The focus control information is information for performing autofocus control in the imaging apparatus 100.

The line-of-sight detection unit 114 generates a line-of-sight detection result by detecting the line of sight of the user. The generated line-of-sight detection result is supplied from the line-of-sight detection unit 114 to the control unit 101.

[Regarding Line-of-Sight Information and Gaze Region]

Next, a specific example of processing of detecting the line of sight of the user by the line-of-sight detection unit 114 will be described. For example, the line-of-sight detection unit 114 images the eyes of the user (image capturing person) and detects the line-of-sight direction of the user using an image of the eyes. That is, the line-of-sight detection unit 114 includes, for example, a camera unit that images the user's eyes and a unit that detects the line-of-sight direction of the user. The camera unit may include a light emitting unit that emits infrared light and the like.

As a method of detecting the line-of-sight direction of the user, a known method can be applied. For example, it is possible to apply a corneal reflection method of emitting infrared light or the like and using reflection from the cornea to detect the line-of-sight direction of the user on the basis of the position of the pupil. Furthermore, for example, a method of recognizing a point that does not move such as the inner corner of the eye or the outer corner of the eye by image recognition and estimating the line-of-sight direction from the position of the iris of the eye may be applied.

The line-of-sight detection unit 114 is provided, for example, in a viewfinder of the imaging apparatus 100. The line-of-sight detection unit 114 may be provided in a housing of the imaging apparatus 100. For example, the line-of-sight detection unit 114 may be provided on a surface of the housing of the imaging apparatus 100 on which the display unit 110 is provided.

The line-of-sight direction detected by the line-of-sight detection unit 114 is supplied to the control unit 101.

Figure 2:
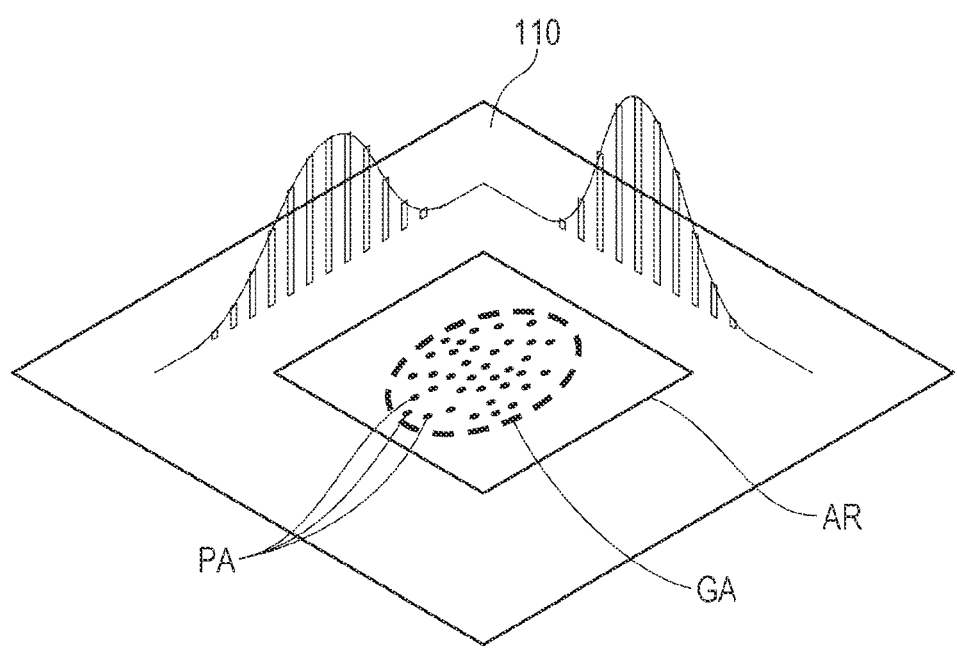
FIG. 2 is a diagram to be referred to in explanation of processing of specifying a gaze region.

The gaze region specifying unit 101A of the control unit 101 generates the line-of-sight information from the line-of-sight detection result supplied from the line-of-sight detection unit 114. The line-of-sight information is, for example, information indicating a distribution of the line-of-sight detection result. Specifically, as illustrated in FIG. 2, the line-of-sight information is a distribution of the line-of-sight detection result PA, which is a portion corresponding to the line-of-sight direction on the display unit 110. The line-of-sight information is obtained for each appropriate region AR of the display unit 110. The region AR may be in units of pixels or in units of blocks of M pixels×N pixels (M and N are appropriate positive numbers). The gaze region specifying unit 101A specifies a region at which the user gazes as a gaze region on the basis of the distribution of the line-of-sight detection result PA. For example, as illustrated in FIG. 2, the gaze region specifying unit 101A obtains a histogram of values (hereinafter, appropriately referred to as gaze levels) of the distribution of the line-of-sight detection result PA corresponding to both an X-axis direction and a Y-axis direction on the display unit 110, and specifies one or a plurality of regions AR corresponding to a peak thereof as a gaze region GA. Furthermore, the gaze region specifying unit 101A may obtain a variance value for each point obtained by dividing the histogram with a predetermined resolution, and specify a region where the variance value is equal to or greater than a threshold as the gaze region GA. Furthermore, a gaze region that has an area determined to be a predetermined value and extends from a region where the gaze level is high to a region where the area becomes the predetermined value may be set as the gaze region GA. Furthermore, a region where the gaze level is equal to or greater than a threshold may be set as the gaze region GA.

Note that the line-of-sight information may be information indicating a trajectory of the line-of-sight detection result PA. For example, in a case where the trajectory of the line-of-sight detection result PA falls within a certain region within a predetermined time of about several seconds, the gaze region specifying unit 101A may specify the region as the gaze region GA.

[Specific Example of Processing by Display Image Generation Unit]

Next, a specific example of processing performed by the display image generation unit 101B will be described. In the present example, an AF frame displayed on the basis of focus information indicating a point in focus in a captured image will be described as an example of superimposition information.

Note that the superimposition information can be divided into information (hereinafter, appropriately referred to as dynamic superimposition information) linked to the display content of the display unit 110 or the state of the imaging apparatus 100 and information (hereinafter, appropriately referred to as fixed superimposition information) capable of changing the display position to an appropriate position without involving movement as a whole although a value is changed. Examples of the display of the dynamic superimposition information include, in addition to the above-described AF frame, a zebra display indicating a bright portion equal to or higher than a set value, a peaking display indicating a portion (portion in focus) having a high-frequency component, a horizontal indicator indicating the inclination of the imaging apparatus 100, and the like. The AF frame, the peaking display, and the zebra display can also be display of image state information indicating the state of the captured image in the imaging apparatus 100. Examples of the display of the fixed superimposition information include a remaining capacity of a battery, the number of images that can be captured, the shutter speed, the ISO sensitivity, and the like.

From another point of view, the superimposition information is imaging apparatus state information indicating the state of the imaging apparatus 100. The imaging apparatus state information is setting information indicating a setting of the imaging apparatus 100. Examples of the setting information include the shutter speed, the aperture value, the ISO sensitivity, a mode dial, a flash mode, and the like. Examples of the imaging apparatus state information other than the setting information include the remaining capacity of the battery, the number of images that can be captured, and the like.

Figure 3:
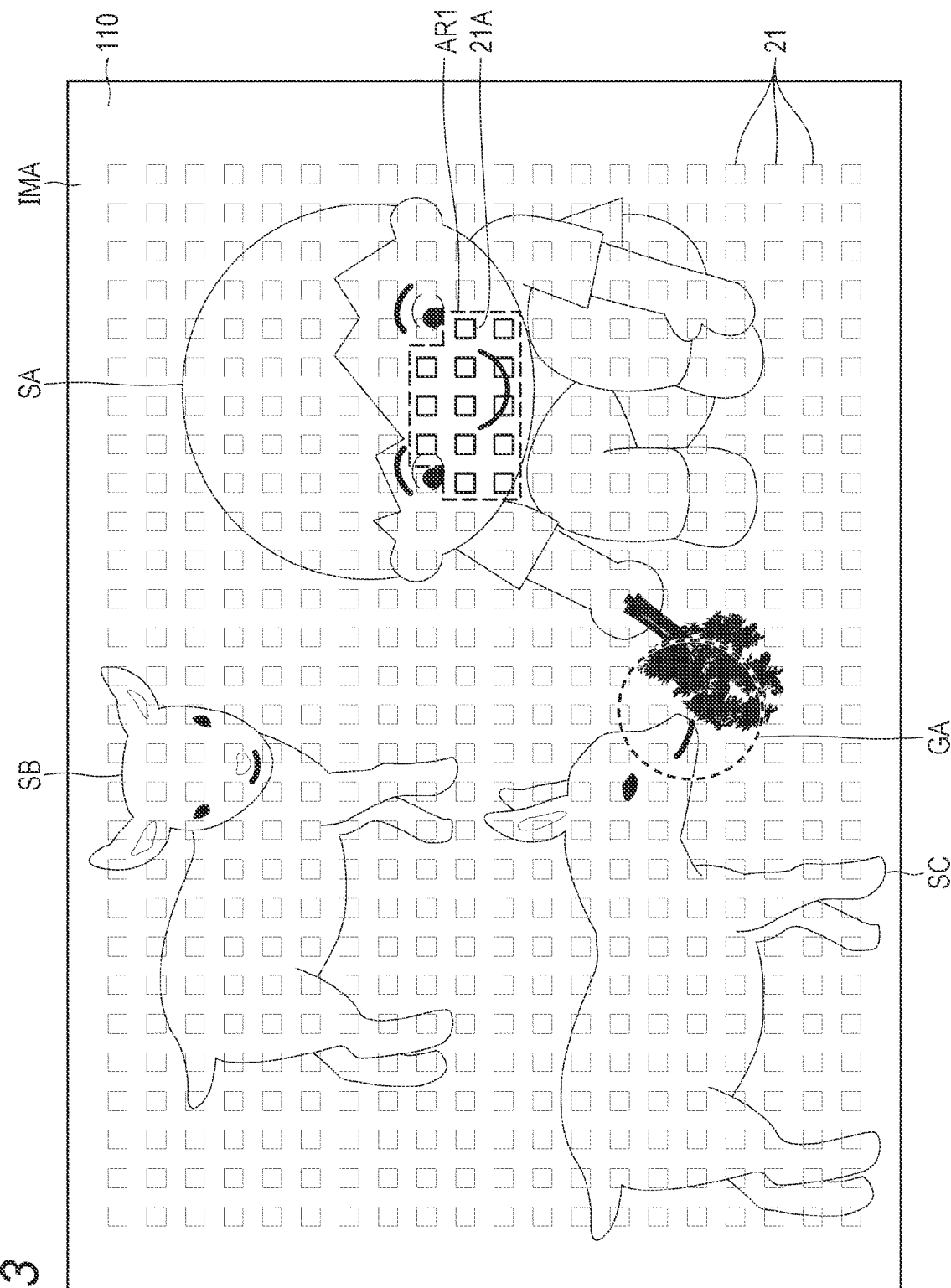
FIG. 3 is a diagram to be referred to in explanation of processing by a display image generation unit according to the embodiment.

FIG. 3 illustrates an example of a through image displayed on the display unit 110. On the display unit 110, an image IMA including, as a subject, a person SA as a child and two deer SB and SC is displayed.

Here, an example is considered in which the vicinity of the center of the face of the person SA is specified as the gaze region GA by the gaze region specifying unit 101A, and rectangular AF frames are displayed in the specified portion. Note that, in FIG. 3, the AF frames (hereinafter, appropriately referred to as AF frames 21A) that are actually displayed are displayed darker than other AF frames 21. A region including the plurality of displayed AF frames 21A corresponds to a superimposition information display region AR1 for displaying the superimposition information. Furthermore, although the gaze region GA is illustrated in FIG. 3 and the like, a dotted line that defines the gaze region GA is basically not displayed on the display unit 110. However, the gaze region GA may be displayed in a mode in which the gaze region GA can be recognized by the user.

Figure 4:
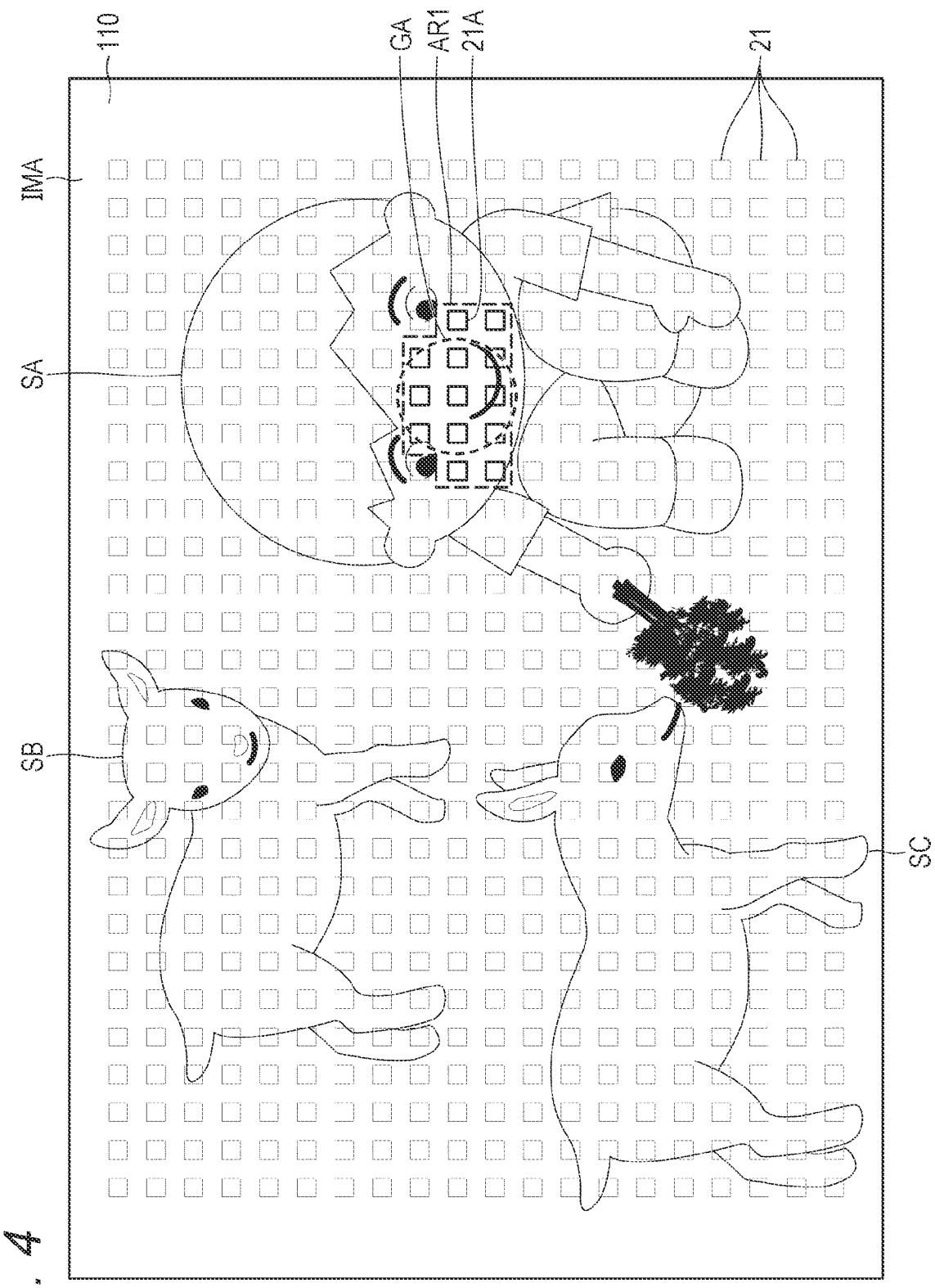
FIG. 4 is a diagram to be referred to in explanation of processing by the display image generation unit according to the embodiment.

As illustrated in FIG. 3, in a case where the gaze region GA and the superimposition information display region AR1 do not overlap each other, the AF frames 21A are displayed in a normal display mode (rectangular shape). However, as illustrated in FIG. 4, in a case where an AF frame 21A is displayed in the gaze region GA, it may be difficult to understand the expression of the person SA, and there is a possibility that a shutter scene (which may be a timing to start capturing a moving image) may be missed. Therefore, the display image generation unit 101B performs the line-of-sight correspondence display image generation processing of generating a display image on the basis of the overlapping state between the gaze region GA and the superimposition information display region AR1 for displaying the AF frame 21A. In the present embodiment, on the basis of whether or not the gaze region GA and the superimposition information display region AR1 overlap each other, more specifically, in a case where the gaze region GA and the superimposition information display region AR1 overlap each other, the display image generation unit 101B performs the line-of-sight correspondence display image generation processing. Note that the display image generation unit 101B may perform the line-of-sight correspondence display image generation processing in a case where the size or ratio of the region where the gaze region GA and the superimposition information display region AR1 overlap each other are equal to or larger than a certain value.

Specifically, the line-of-sight correspondence display image generation processing performed by the display image generation unit 101B is processing of performing overlapping correspondence display image generation processing in which, in a case where the superimposition information display region AR1 and the gaze region GA overlap each other, an AF frame (hereinafter, appropriately referred to as an AF frame 21B) in the overlapping region where the superimposition information display region AR1 and the gaze region GA overlap each other and the AF frame 21A in the non-overlapping region which is the other region are in different display forms in the display image on the display unit 110.

First Specific Example

Figure 5:
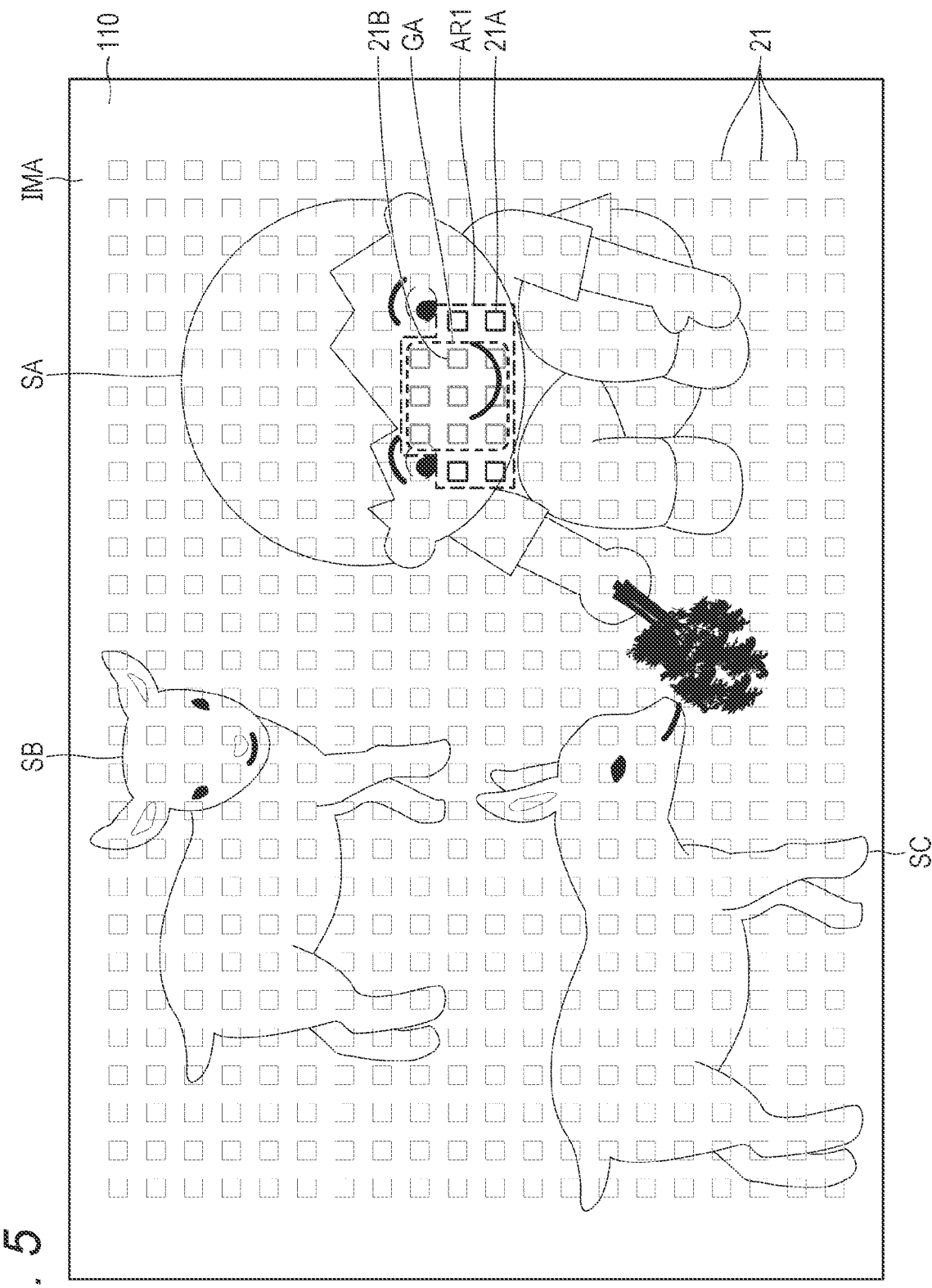
FIG. 5 is a diagram to be referred to in explanation of processing by the display image generation unit according to the embodiment.

As a first specific example of the overlapping correspondence display image generation processing, as illustrated in FIG. 5, the display image generation unit 101B generates a display image in which the display mode of the AF frame 21B in the overlapping region where the superimposition information display region AR1 and the gaze region GA overlap each other is made translucent, and the display mode of the AF frame 21A in the non-overlapping region where the superimposition information display region AR1 and the gaze region GA do not overlap is set to a transmittance similar to a normal transmittance. The generated image is displayed on the display unit 110. By increasing the transmittance of the AF frame 21B in the overlapping region by the translucency and the like, the user can confirm the subject in the gaze region GA. Note that the transmittance can be expressed by the following equation where the transmittance is T.

$$\text{An output image} = \text{a captured image} \times T + \text{an OSD image} \times (1-T)$$

(The transmittance corresponds to an α value of image processing that is generally referred to as alpha blending)

Note that the translucency is not necessarily a transmittance of 50%, and may be, for example, a transmittance equal to or higher than a predetermined transmittance at which the face of the person SA can be visually recognized.

In this example, the transmittance of the AF frame 21B may vary depending on the position in the overlapping region. For example, in the overlapping region, the transmittance of the AF frame 21B may vary between a region near the outer edge of the overlapping region and a region other than the region near the outer edge of the overlapping region. Specifically, the transmittance of the AF frame 21B in the region other than the region near the outer edge of the overlapping region may be made lower than the transmittance of the AF frame 21B in the region near the outer edge of the overlapping region.

Second Specific Example

Figure 6:
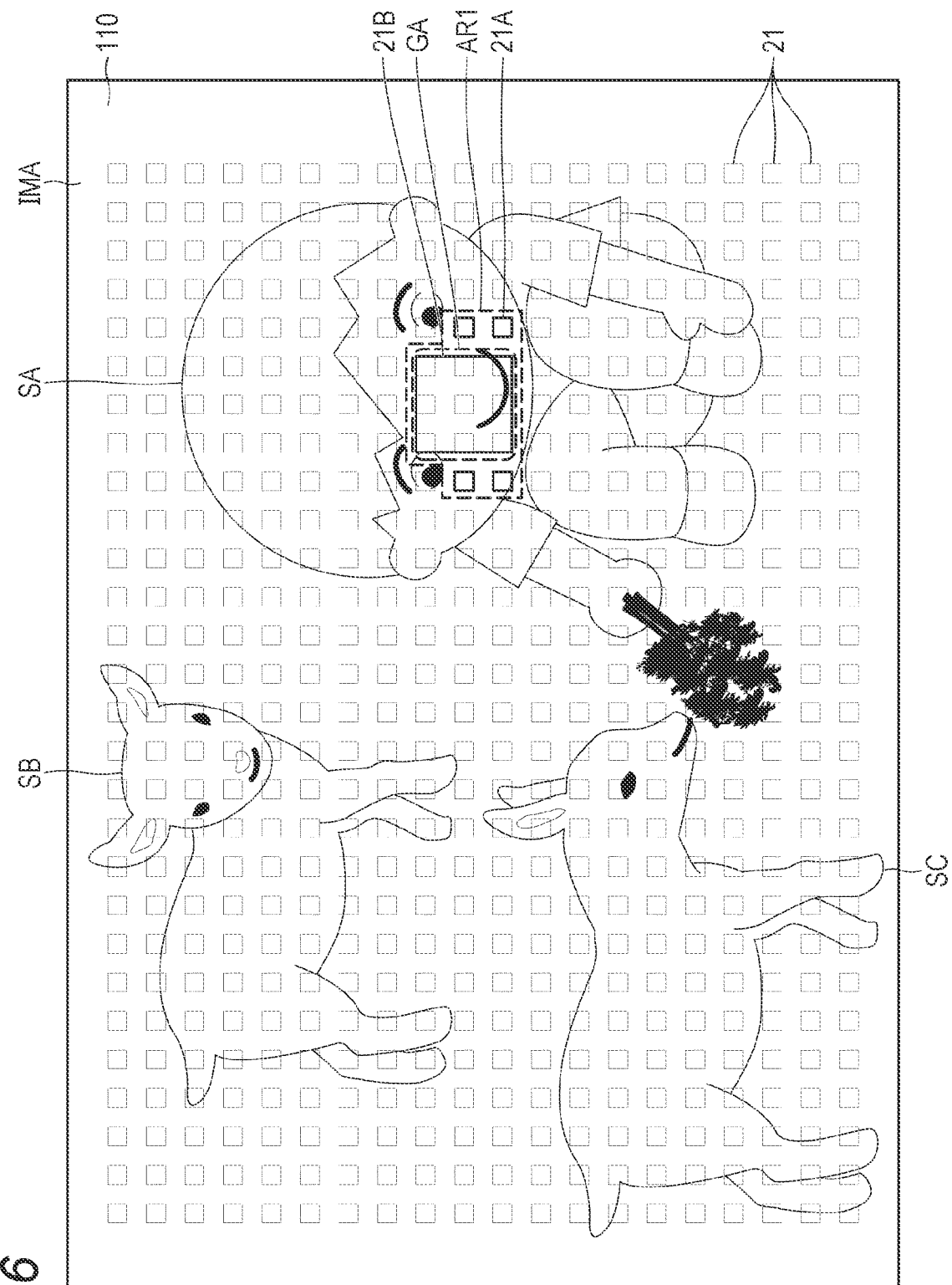
FIG. 6 is a diagram to be referred to in explanation of processing by the display image generation unit according to the embodiment.

As a second specific example of the overlapping correspondence display image generation processing, as illustrated in FIG. 6, the display image generation unit 101B generates a display image in which the display shape of the AF frame 21B in the overlapping region where the superimposition information display region AR1 and the gaze region GA overlap each other is made different from the display shape of the AF frame 21A in the non-overlapping region where the superimposition information display region AR1 and the gaze region GA do not overlap. For example, the AF frame 21B in the overlapping region has a rectangular display shape larger than the AF frame 21A in the non-overlapping region so that the user can confirm the face of the person SA in the overlapping region. With such processing, the user can confirm the subject in the gaze region GA.

Figure 7:
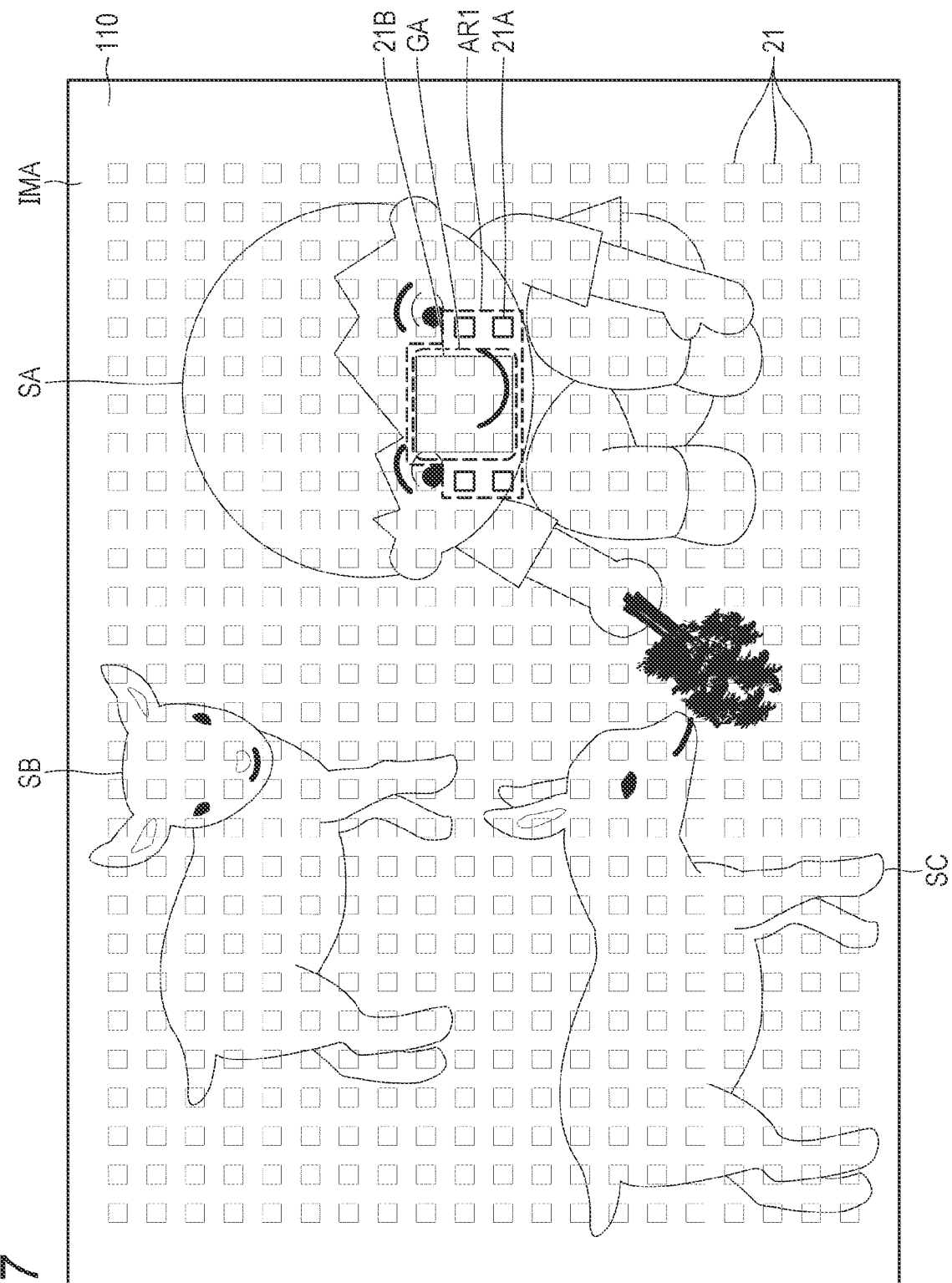
FIG. 7 is a diagram to be referred to in explanation of processing by the display image generation unit according to the embodiment.

Furthermore, in the present example, as illustrated in FIG. 7, the display image generation unit 101B may generate a display image in which the frame line of the AF frame 21B in the overlapping region is thinned, and the display image may be displayed on the display unit 110. Since the frame of the AF frame 21B is thin, the user can more easily confirm the image of the portion of the overlapping region. Note that the thickness of the frame of the outer edge may be reduced while the shape of AF frame 21B is maintained in a default display mode.

Figure 8:
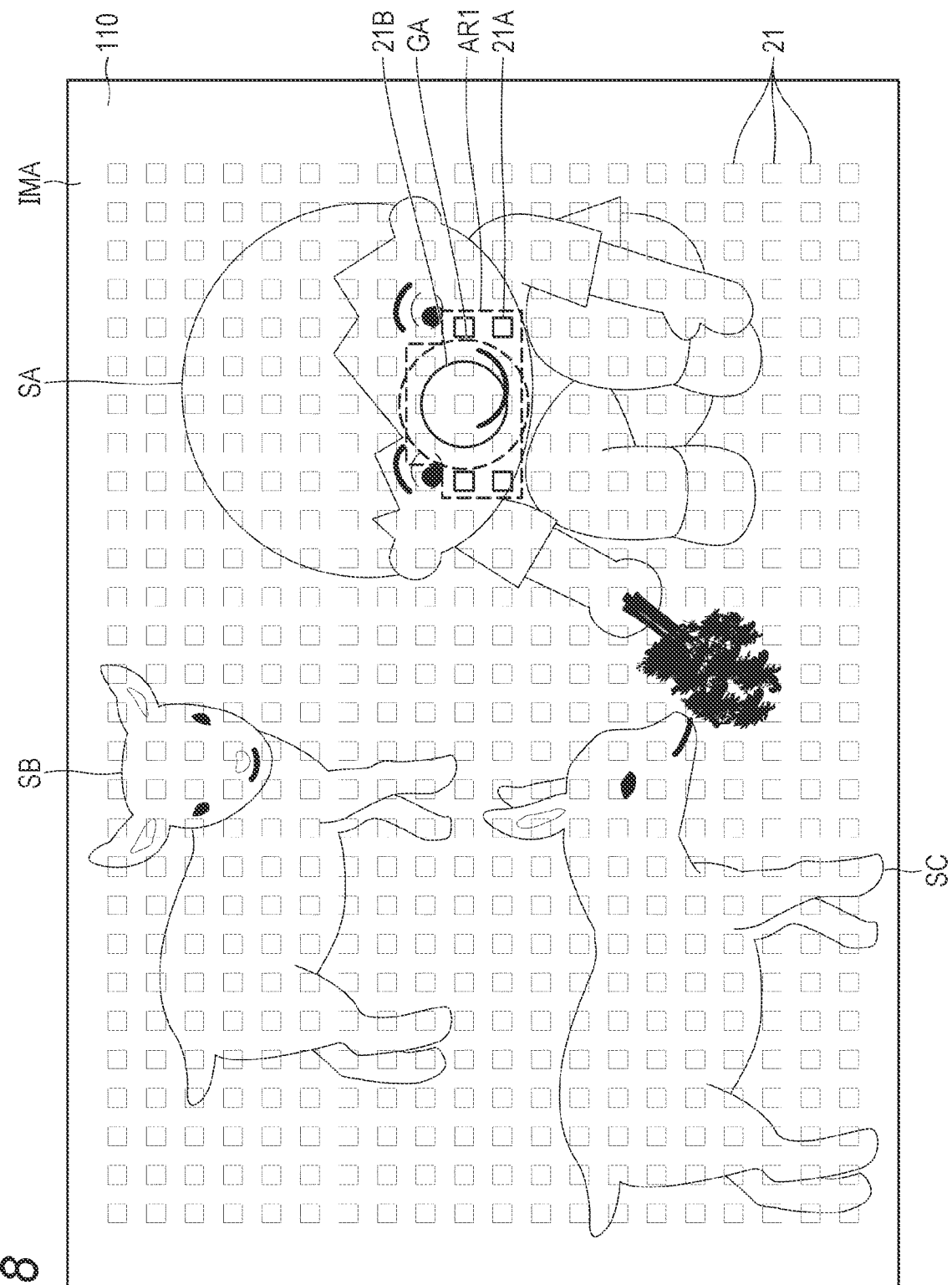
FIG. 8 is a diagram to be referred to in explanation of processing by the display image generation unit according to the embodiment.

Furthermore, as illustrated in FIG. 8, the shape of the AF frame 21B in the overlapping region may be changed. For example, the AF frame 21B may have a rectangular shape, a circular shape, an elliptical shape, or a polygonal shape. The shape of the AF frame 21B may vary depending on the position in the overlapping region.

Third Specific Example

Figure 9:
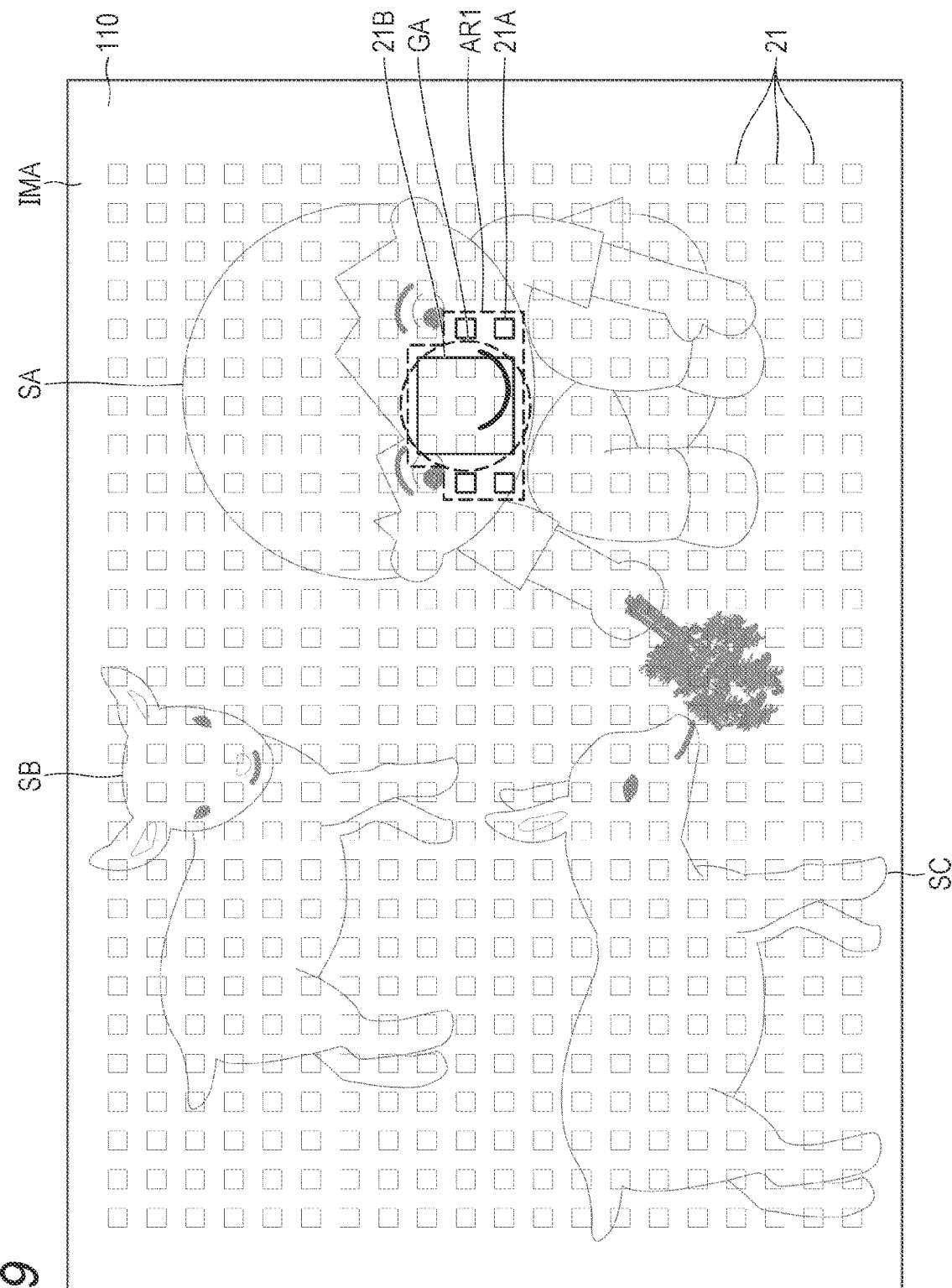
FIG. 9 is a diagram to be referred to in explanation of processing by the display image generation unit according to the embodiment.

A third specific example of the overlapping correspondence display image generation processing is an example in which a display image that makes the gaze region GA conspicuous is generated while the transmittance and the display shape of the frame of the AF frame 21B in the overlapping region are changed as in the first specific example and the second specific example described above. Specifically, as illustrated in FIG. 9, the display image generation unit 101B may lower the luminance of a region outside the overlapping region by halftone and the like so that the image of the overlapping region is more conspicuous than other regions. In the present example, a display image in which the display image of the overlapping region is most easily viewed, the superimposition information display region AR1 is the second easiest to view, and other portions are the most difficult to view may be generated and displayed.

As another specific example, in a case where overlapping information in the gaze region GA is superimposition information that does not need to be displayed in the gaze region GA, the display position of the superimposition information may be moved to the outside of the gaze region GA. That is, the superimposition information display region may be set to a region that does not overlap the gaze region. An example of the superimposition information that does not need to be displayed in the gaze region GA is the fixed superimposition information. Furthermore, in a case where the regions overlap each other, the superimposition information may be moved so that the area is smaller than the current overlapping region.

[Flow of Processing]

Figures 10, 11:
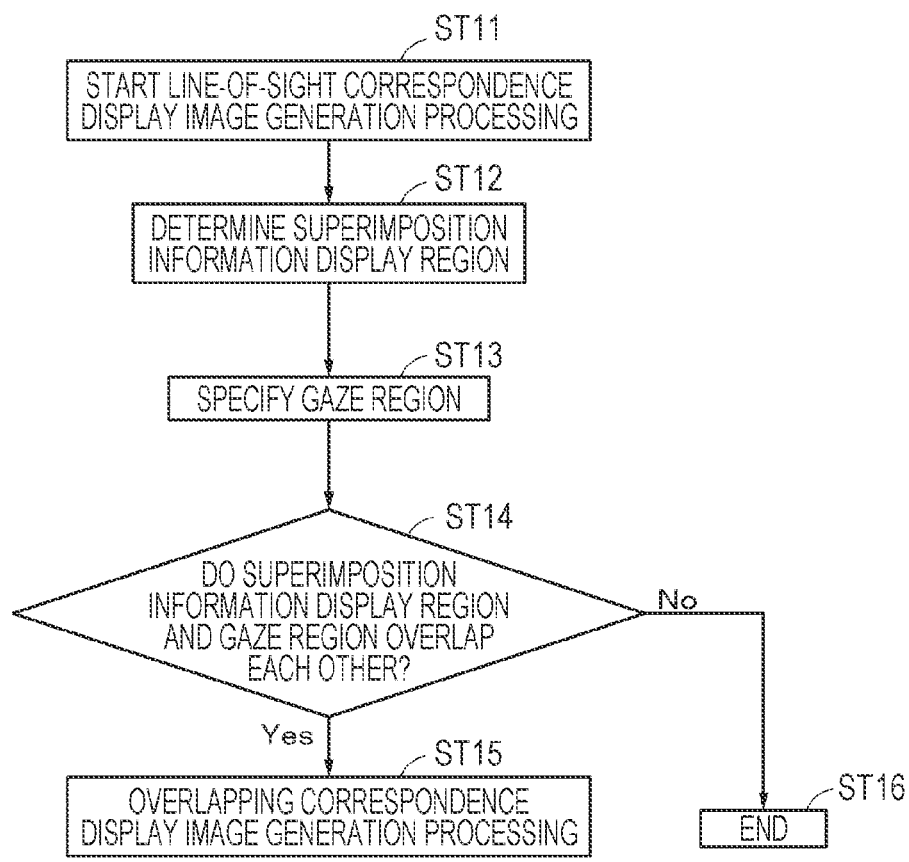

FIG. 10 is a flowchart illustrating a flow of processing performed by the imaging apparatus 100. The processing described below is performed, for example, when the power supply of the imaging apparatus 100 is turned on. The processing may be started at a stage where the user is in a position to lift the imaging apparatus 100 and capture an image according to a result of detection by a gyro sensor or a pressure-sensitive sensor. Furthermore, the processing may be started after the line of sight is detected by the line-of-sight detection unit 114. The processing may be repeated while the line of sight is detected. In step ST11, the line-of-sight correspondence display image generation processing is started. Then, the processing proceeds to step ST12.

In step ST12, on the basis of the focus control information supplied from the AF control unit 113, the control unit 101 determines a superimposition information display region AR1 for displaying an AF frame 21A, which is an example of superimposition information, on the display unit 110. Then, the processing proceeds to step ST13.

In step ST13, a gaze region GA is determined. That is, the gaze region specifying unit 101A specifies the gaze region GA on the display unit 110 on the basis of a result of detecting the line of sight by the line-of-sight detection unit 114. Then, the processing proceeds to step ST14.

In step ST14, the control unit 101 determines whether or not the superimposition information display region AR1 and the gaze region GA overlap each other. In a case where the determination of step ST14 is No, the processing proceeds to step ST16.

In step ST16, since the superimposition information display region AR1 and the gaze region GA do not overlap each other, the display image generation unit 101B generates a display image in which the AF frame 21A is displayed in the normal display mode (default display mode) such as a rectangle. The generated display image is displayed on the display unit 110 (see FIG. 3).

In the determination processing of step ST14, it is determined whether or not the superimposition information display region AR1 and the gaze region GA overlap each other. In a case where the determination in step ST14 is Yes, the processing proceeds to step ST15.

In step ST15, the display image generation unit 101B performs the overlapping correspondence display image generation processing of generating an overlapping correspondence display image. The overlapping correspondence display image is an image in which the transmittance or the display shape of the AF frame 21B in the overlapping region is changed or the overlapping region is made conspicuous (see FIGS. 5 to 9). The overlapping correspondence display image is displayed on the display unit 110.

According to the present embodiment described above, it is possible to prevent the display content of the gaze region at which the user gazes from becoming difficult to view due to the OSD that is the AF frame and the like. Therefore, the display content in the gaze region, which is a portion on which the user concentrates his/her attention, becomes easy to view, and thus it is possible to appropriately determine the moment at which the user shutters or the timing at which the user captures a moving image.

Second Embodiment

Next, a second embodiment will be described. Note that, in the description of the second embodiment, the same or similar configurations as or to those in the above description are denoted by the same reference signs, and redundant description is appropriately omitted. Furthermore, the matters described in the first embodiment can be applied to the second embodiment unless otherwise specified.

The second embodiment is an embodiment in which whether or not to perform the line-of-sight correspondence display image generation processing described in the first embodiment is determined according to an imaging mode, an operation on the imaging apparatus 100, and a property of superimposition information.

First Example

The first example is an example of determining whether or not to perform the line-of-sight correspondence display image generation processing according to the imaging mode. FIG. 11 is a table for explaining an overview of the present example. As illustrated in FIG. 11, in a case where the imaging mode is an AUTO mode and a diaphragm priority mode, the line-of-sight correspondence display image generation processing is not performed (stopped). On the other hand, in a case where the imaging mode is a PROGRAM mode and a shutter speed priority mode, the line-of-sight correspondence display image generation processing is performed (executed).

In the AUTO mode, it is generally assumed that the user of the imaging apparatus 100 is a beginner. Therefore, in a case where the imaging mode is the AUTO mode, the line-of-sight correspondence display image generation processing is not performed. That is, in order to assist a beginner user, the AF frame in the overlapping region is displayed in the normal display mode (rectangular shape).

In the PROGRAM mode (mode in which some settings that are exposure and the like are retained), the line-of-sight correspondence display image generation processing is performed since a user who expects that a control function of the imaging apparatus 100 is performed is assumed.

The diaphragm priority mode is assumed to be an imaging mode set in a case where an object with less motion, such as a landscape, is to be imaged with an emphasis on blurring or the like. Therefore, in a case where the imaging mode is the diaphragm priority mode, in order to reliably notify the user of information as to whether or not the AF is accurate, the line-of-sight correspondence display image generation processing is not performed, and the AF frame in the overlapping region is displayed in the normal display mode (rectangular shape).

The shutter speed priority mode is assumed to be an imaging mode set for the purpose of capturing a moment of a fast moving subject. That is, it is assumed that the user wants to confirm the subject in real time. Therefore, in a case where the shutter speed priority mode is set, the line-of-sight correspondence display image generation processing is performed so that the user can easily confirm the displayed content in the gaze region GA.

Figure 12:
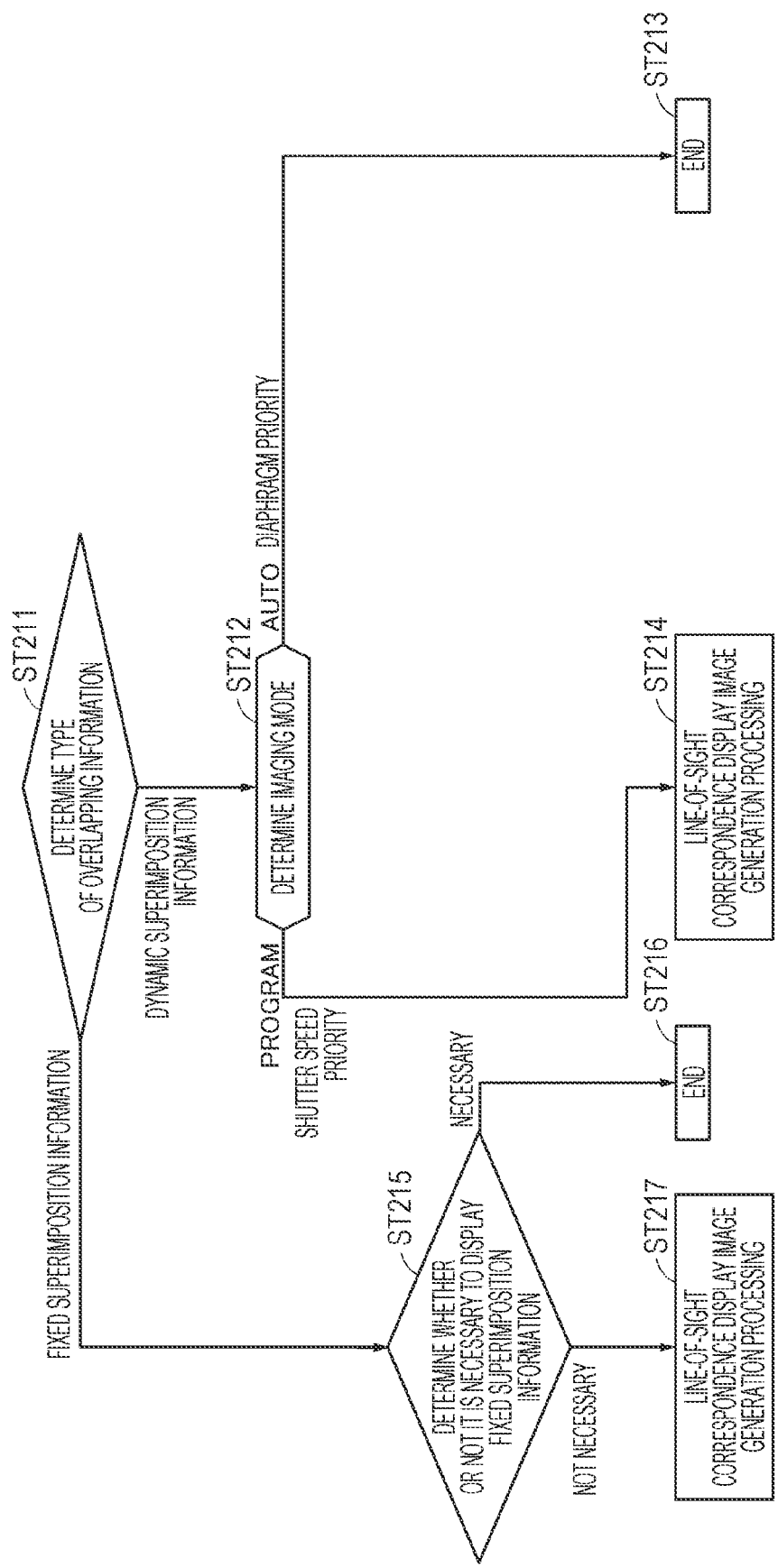

FIG. 12 is a flowchart illustrating a detailed flow of processing according to the present example. In step ST211, the control unit 101 determines whether information is the fixed superimposition information or the dynamic superimposition information, and determines the type of the overlapping information. Here, in a case where it is determined that the overlapping information is the above-described dynamic superimposition information, the processing proceeds to step ST212.

In step ST212, the control unit 101 determines the imaging mode. As a result of the determination, in a case where the imaging mode is the AUTO mode or the diaphragm priority mode, the processing proceeds to step ST213. In step ST213, the line-of-sight correspondence display image generation processing is not performed.

In a case where the result of the determination is the PROGRAM mode or the shutter speed wired mode in the determination processing of step ST212, the processing proceeds to step ST214. In step ST214, the line-of-sight correspondence display image generation processing is performed by the display image generation unit 101B.

In a case where it is determined in the determination processing of step ST211 that the superimposition information is the fixed superimposition information, the processing proceeds to step ST215.

In step ST215, the control unit 101 determines whether or not it is necessary to display the fixed superimposition information. Here, in a case where the control unit 101 determines that it is necessary to display the fixed superimposition information, the processing proceeds to step ST216, and the processing ends without performing the line-of-sight correspondence display image generation processing. In a case where the control unit 101 determines that it is not necessary to display the fixed superimposition information, the processing proceeds to step ST216, and the line-of-sight correspondence display image generation processing is performed.

In step ST215, for example, the control unit 101 determines the necessity of displaying the fixed superimposition information as follows. In a case where the shutter button of the imaging apparatus 100 is in the half-pressed state (hereinafter, appropriately referred to as an S1 state), since the user is in a position to capture an image, the control unit 101 determines that it is unnecessary to display the fixed superimposition information. As another example, in a case where the fixed superimposition information is the remaining capacity of the battery, and the remaining capacity of the battery is sufficient (for example, equal to or greater than a threshold (for example, 70%)), the need to display the remaining capacity of the battery is low. Therefore, in a case where the remaining capacity of the battery is sufficient, the control unit 101 determines that it is not necessary to display the remaining capacity of the battery. On the other hand, in a case where the remaining capacity of the battery is less than the threshold, the control unit 101 determines that it is necessary to display the remaining capacity of the battery.

Furthermore, as another example, the control unit 101 determines the necessity of displaying the fixed superimposition information on the basis of the time during which the gaze region GA overlaps the superimposition information display region where the fixed superimposition information is displayed. In a case where the time during which the gaze region GA and the superimposition information display region where the fixed superimposition information is displayed overlap each other is equal to or longer than a threshold (for example, several 10 seconds), the control unit 101 determines that it is necessary to display the fixed superimposition information on the assumption that the user has checked the content of the fixed superimposition information. On the other hand, in a case where the time during which the gaze region GA and the superimposition information display region where the fixed superimposition information is displayed overlap each other is shorter than the threshold (for example, several 10 seconds), the control unit 101 determines that it is not necessary to display the fixed superimposition information.

Furthermore, as another example, the control unit 101 determines the necessity of displaying the fixed superimposition information according to the degree of superimposition of the fixed superimposition information and the main subject. The main subject can be specified using a known method in which the largest subject among a plurality of subjects is the main subject, and the like. In a case where the degree of superimposition of the fixed superimposition information and the main subject is equal to or greater than a certain level, it is necessary to make the main subject easily viewable, and thus the control unit 101 determines that it is not necessary to display the fixed superimposition information. Furthermore, in a case where the degree of superimposition of the fixed superimposition information and the main subject is less than the certain level, the display of the main subject is not hindered by the fixed superimposition information, and thus the control unit 101 determines that it is necessary to display the fixed superimposition information.

Note that, as in the present example, the type of the superimposition information is determined because, in a case where the superimposition information is the fixed superimposition information, the superimposition information is often displayed near the outer edge of the display unit 110, and often does not overlap the gaze region GA. Therefore, the fixed superimposition information can be appropriately displayed by determining the necessity of displaying the fixed superimposition information.

Second Example

The second example is an example of determining whether or not to perform the line-of-sight correspondence display image generation processing according to the operation state of the user in each imaging mode. Note that redundant description of processing similar to that of the first example according to the present embodiment described above will be appropriately omitted. Furthermore, in the present example, a pressing state (S0 state (state in which the shutter button is not pressed)/S1 state (state in which the shutter button is half-pressed)) of the shutter button will be described as an example of the operation state of the user.

FIG. 13 is a table for explaining an overview of the present example. As illustrated in FIG. 13, in the AUTO mode, it is generally assumed that the user of the imaging apparatus 100 is a beginner. Therefore, in a case where the imaging mode is the AUTO mode, the line-of-sight correspondence display image generation processing is not performed regardless of the state of the shutter button. That is, in order to assist a beginner user, the AF frame in the overlapping region is displayed in the normal display mode (rectangular shape).

In the PROGRAM mode (mode in which some settings that are exposure and the like are retained), it is assumed that the user expects to perform the control function of the imaging apparatus 100, and thus the line-of-sight correspondence display image generation processing is performed regardless of the state of the shutter button.

The diaphragm priority mode is assumed to be an imaging mode set in a case where an object with less motion, such as a landscape, is to be imaged with an emphasis on blurring or the like. In a case where the state is the S0 state in the diaphragm priority mode, it is assumed that the user is in a stage of confirming the subject, and thus the line-of-sight correspondence display image generation processing is performed to easily confirm the subject. On the other hand, in a case where the shutter button is in the S1 state, since it is considered that the composition of the imaging has already been confirmed and that the imaging is about to be performed, the line-of-sight correspondence display image generation processing is not performed, in other words, the AF frame is displayed in the normal mode, and information regarding whether or not the AF is accurate is provided to the user.

The shutter speed priority mode is assumed to be an imaging mode set for the purpose of capturing a moment of a fast moving subject. In a case where the imaging mode is the shutter speed priority mode and the state is the S0 state, it is considered that the user tracks the subject, but the line-of-sight correspondence display image generation processing is stopped so that the user can confirm the focus state of the subject to be tracked. In a case where the state is the S1 state, since it is considered that the user continues to wait for a good timing to capture an image, the line-of-sight correspondence display image generation processing is performed.

Figure 14:
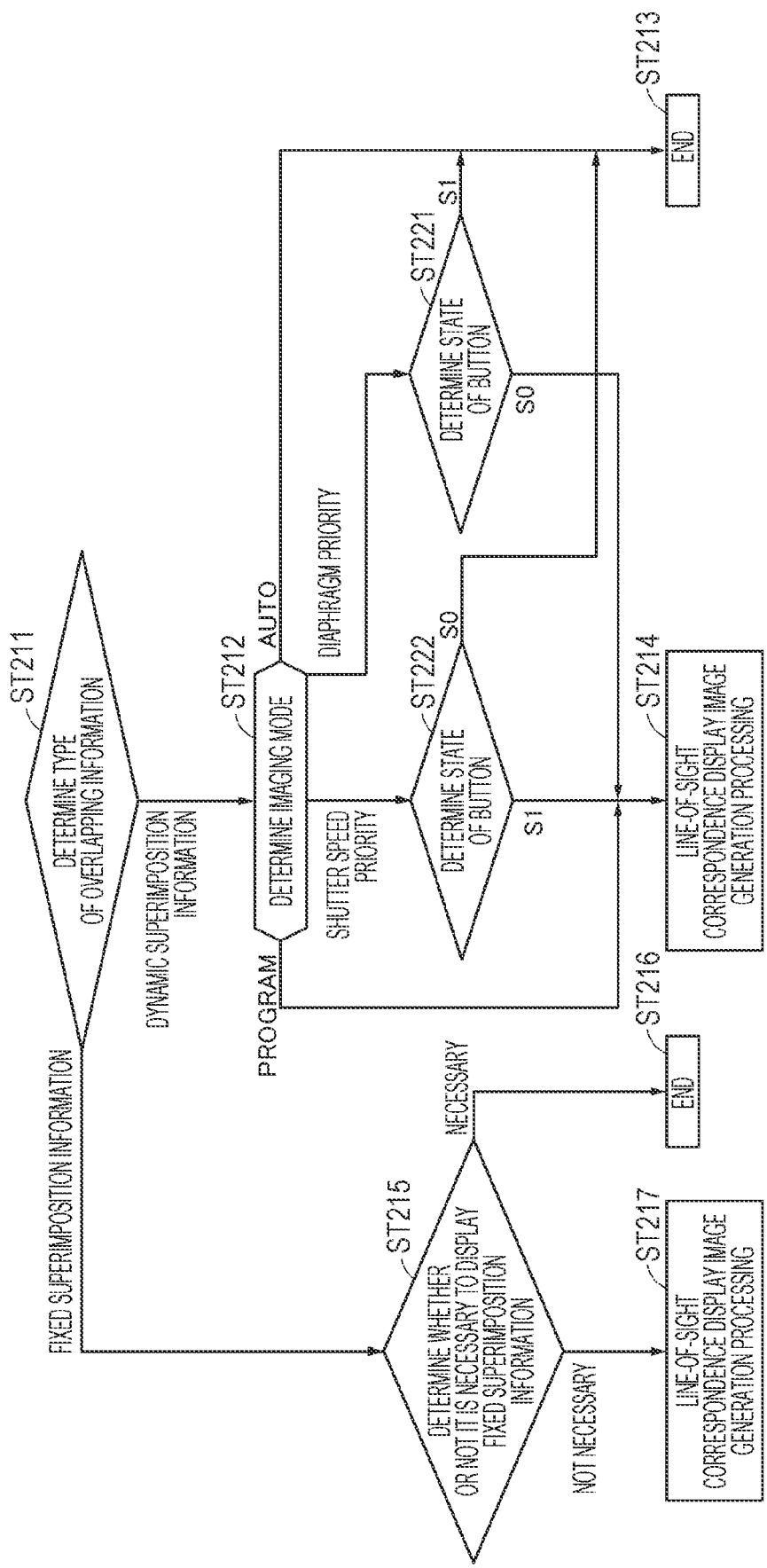

FIG. 14 is a flowchart illustrating a detailed flow of processing according to the present example. Since the processing (processing according to step ST211) of determining the type of the superimposition information, the processing (processing according to step ST212) of determining the imaging mode, and the processing (processing according to steps ST215 to ST217) in a case where the superimposition information is the fixed superimposition information are similar to the processing in the first example described above, redundant description will be omitted.

In a case where the imaging mode is the AUTO mode in the determination processing according to step ST212, the processing proceeds to step ST213. In a case where the imaging mode is the AUTO mode, regardless of the state of the shutter button, processing of generating a normal display image is performed without performing the line-of-sight correspondence display image generation processing. Furthermore, in a case where the imaging mode is the PROGRAM mode, the processing proceeds to step ST214, and the line-of-sight correspondence display image generation processing is performed regardless of the state of the shutter button.

In a case where the imaging mode is the diaphragm priority mode in the determination processing according to step ST212, the processing proceeds to step ST221. In step ST221, the control unit 101 determines the state of the shutter button. Here, if the state of the shutter button is the S1 state, the line-of-sight correspondence display image generation processing is not performed, and normal display image generation processing is performed. Furthermore, if the state of the shutter button is the S0 state, the line-of-sight correspondence display image generation processing is performed by the display image generation unit 101B.

In a case where the imaging mode is the shutter speed priority mode in the determination processing according to step ST222, the processing proceeds to step ST222. In step ST222, the control unit 101 determines the state of the shutter button. Here, if the state of the shutter button is the S0 state, the line-of-sight correspondence display image generation processing is not performed, and the normal display image generation processing is performed. Furthermore, if the state of the shutter button is the S1 state, the line-of-sight correspondence display image generation processing is performed by the display image generation unit 101B.

Third Example

The third example is an example of determining whether or not to perform the line-of-sight correspondence display image generation processing according to the operation state of the user in each imaging mode. Note that redundant description of processing similar to that of the first and second examples according to the present embodiment described above will be appropriately omitted. Furthermore, in the present example, in addition to the second example, whether or not to perform the line-of-sight correspondence display image generation processing is determined according to whether or not a button to which an AF-ON function is assigned is pressed as the operation state of the user. Note that AF-ON means a function of activating the AF by pressing a predetermined button (generally, a button on the back surface of the camera that can be pressed with a thumb) in a case where it is desired to separately perform the AF and shutter release. Normally, the AF frame is displayed in a state in which the shutter button is in the S1 state or in a state in which the button to which the AF-ON, that is, the AF-ON function is assigned is pressed.

FIG. 15 is a table for explaining an overview of the present example. As illustrated in FIG. 15, in the AUTO mode, it is generally assumed that the user of the imaging apparatus 100 is a beginner. Therefore, in a case where the imaging mode is the AUTO mode, the line-of-sight correspondence display image generation processing is not performed regardless of the state of the shutter button. That is, in order to assist a beginner user, the AF frame in the overlapping region is displayed in the normal display mode (rectangular shape).

In the PROGRAM mode (mode in which some settings that are exposure and the like are retained), it is assumed that the user expects to perform the control function of the imaging apparatus 100, and thus the line-of-sight correspondence display image generation processing is performed regardless of the state of the shutter button.

The diaphragm priority mode is assumed to be an imaging mode set in a case where an object with less motion, such as a landscape, is to be imaged with an emphasis on blurring or the like. In a case where the mode is the diaphragm priority mode and the AF-ON or the shutter button is in the S0 state, the line-of-sight correspondence display image generation processing is performed to make it easy to view the subject while checking the AF frame. Furthermore, in a case where the shutter button is in the S1 state, since it is considered that the composition of the imaging has already been confirmed and that the imaging is about to be performed, the line-of-sight correspondence display image generation processing is not performed, in other words, the AF frame is displayed in the normal mode, and information regarding whether or not the AF is accurate is provided to the user.

The shutter speed priority mode is assumed to be an imaging mode set for the purpose of capturing a moment of a fast moving subject. In a case where the imaging mode is the shutter speed priority mode, and the AF-ON or the shutter button is in the S0 state, the line-of-sight correspondence display image generation processing is not performed and the display of the AF frame is prioritized. Furthermore, in a case where the state of the shutter button is the S1 state, it is considered that the user continues to wait for a good timing to capture an image, and thus the line-of-sight correspondence display image generation processing is performed.

Figure 16:
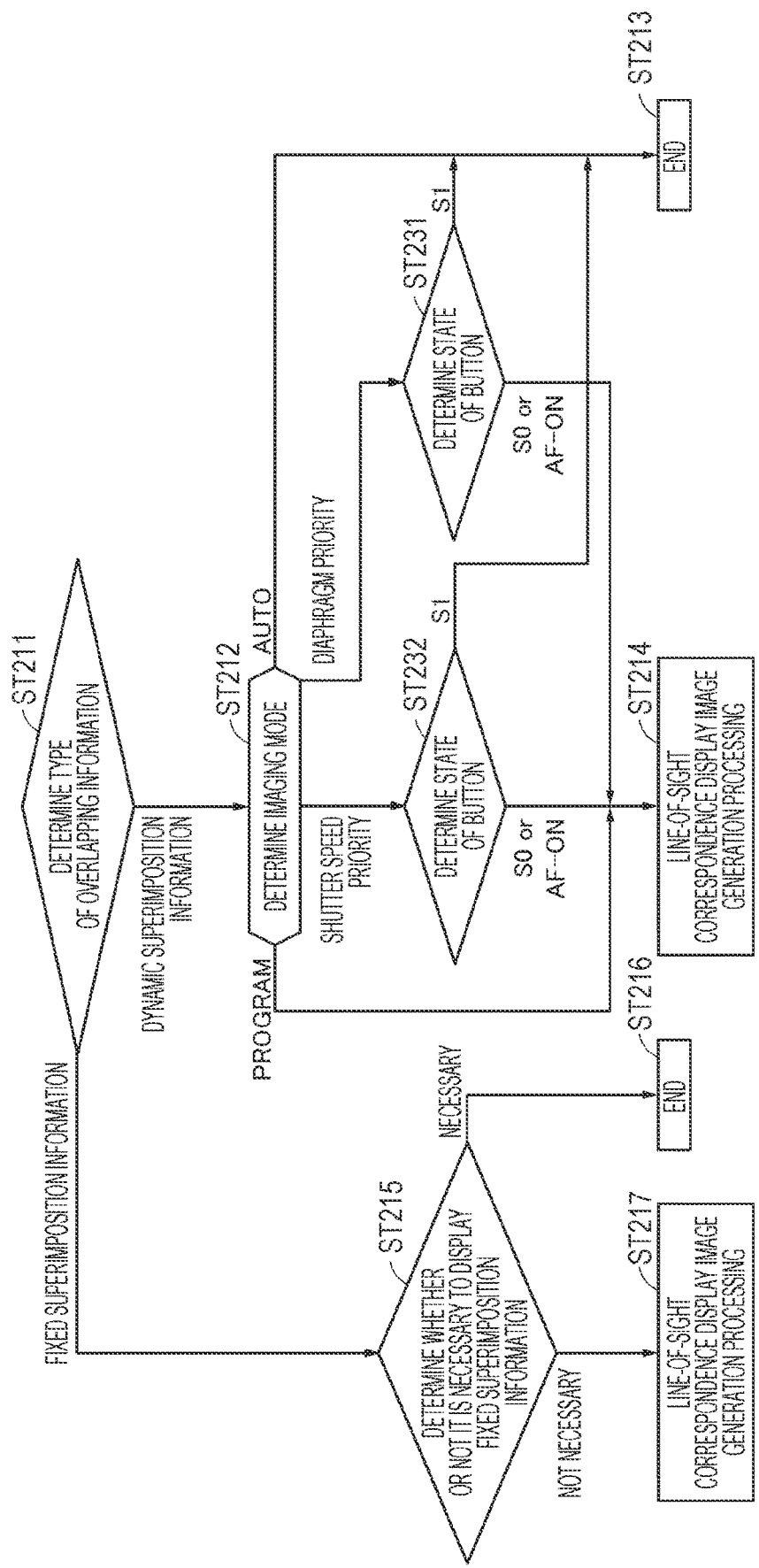

FIG. 16 is a flowchart illustrating a detailed flow of processing according to the present example. Since the processing (processing according to step ST211) of determining the type of the superimposition information, the processing (processing according to step ST212) of determining the imaging mode, and the processing (processing according to steps ST215 to ST217) in a case where the superimposition information is the fixed superimposition information are similar to the processing in the first example described above, redundant description will be omitted.

In a case where the imaging mode is the AUTO mode in the determination processing according to step ST212, the processing proceeds to step ST213. In a case where the imaging mode is the AUTO mode, regardless of the state of the shutter button, processing of generating a normal display image is performed without performing the line-of-sight correspondence display image generation processing. Furthermore, in a case where the imaging mode is the PROGRAM mode, the processing proceeds to step ST214, and the line-of-sight correspondence display image generation processing is performed regardless of the state of the shutter button.

In a case where the imaging mode is the diaphragm priority mode in the determination processing according to step ST212, the processing proceeds to step ST231. In step ST231, the control unit 101 determines the state of the shutter button and determines whether or not the AF-ON is set. Here, if the AF-ON or the shutter button is in the S0 state, the processing proceeds to step ST214, and the line-of-sight correspondence display image generation processing is performed by the display image generation unit 101B. If the state of the shutter button is the S1 state, the line-of-sight correspondence display image generation processing is not performed, and the normal display image generation processing is performed.

In a case where the imaging mode is the shutter speed priority mode in the determination processing according to step ST212, the processing proceeds to step ST232. In step ST232, the control unit 101 determines the state of the shutter button and determines whether or not the AF-ON is set. Here, if the state of the shutter button is the S1 state, the line-of-sight correspondence display image generation processing is not performed, and the normal display image generation processing is performed. Furthermore, if the AF-ON or the shutter button is in the S0 state, the line-of-sight correspondence display image generation processing is performed by the display image generation unit 101B.

<Modifications>

Although the plurality of embodiments of the present disclosure has been specifically described above, the contents of the present disclosure are not limited to the above-described embodiments, and various modifications based on the technical idea of the present disclosure are possible.

In the above-described embodiments, the overlapping correspondence display image generation processing may be processing of determining the display form of the superimposition information in the overlapping region according to the distribution of the gaze levels determined on the basis of the line-of-sight information in the display image. For example, the overlapping correspondence display image generation processing may be processing of increasing the difference between the display form of the superimposition information in the overlapping region and the display form of the superimposition information in the non-overlapping region as the gaze level increases.

Figure 17:
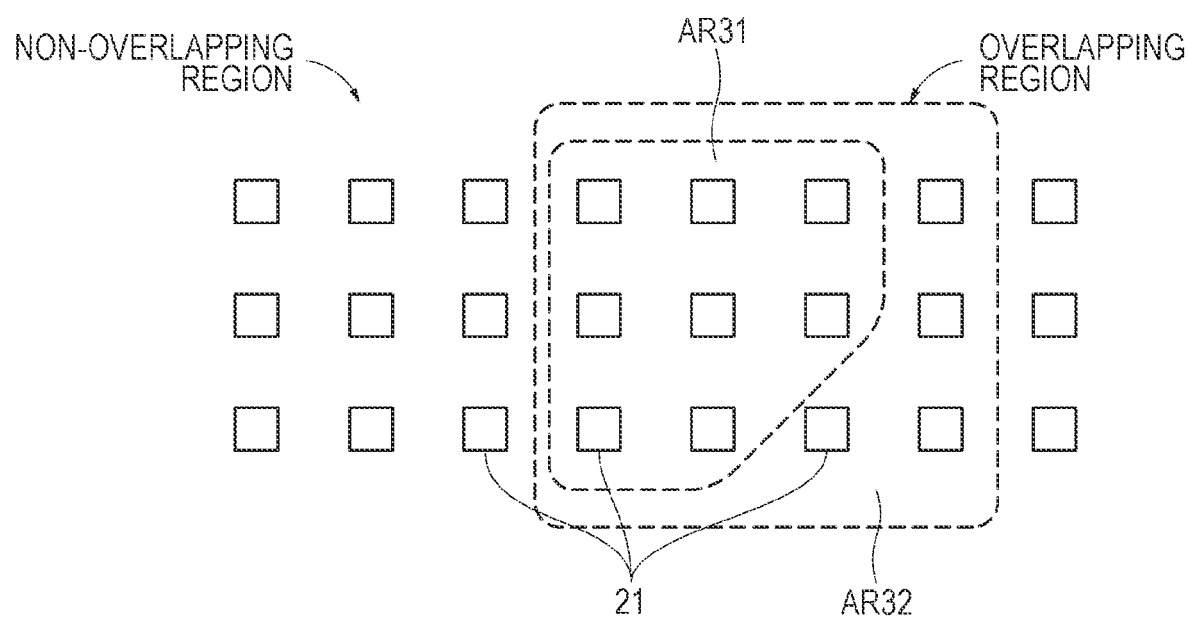
FIG. 17 is a diagram for explaining a modification.

Furthermore, the overlapping correspondence display image generation processing may be processing of changing the display form of the superimposition information in the overlapping region in a stepwise manner according to the distribution of the gaze level. For example, as illustrated in FIG. 17, it is assumed that a region AR31 where the gaze level is higher than the threshold and a region AR32 where the gaze level is less than the threshold are present in the overlapping region. In this case, the display form of the AF frame 21 in the region AR31 and the display form of the AF frame 21 in the region AR32 are changed in a stepwise manner. For example, the AF frame 21 is displayed in the region AR31 with a first transmittance, while the AF frame 21 is displayed in the region AR32 with a second transmittance lower than the first transmittance. That is, the user can easily view the subject in a region with a high gaze level.

Furthermore, as illustrated in FIG. 17, the first display form of the AF frame 21 in the region AR31 (an example of a first region), the second display form of the AF frame 21 in the region AR32 (an example of a second region) in the overlapping region different from the region AR31, and the display form of the AF frame 21 in the non-overlapping region may be different. Specifically, the difference between the display form of the AF frame 21 in the region AR31 and the display form of the AF frame 21 in the non-overlapping region may be larger than the difference between the display form of the region AR32 and the display form of the AF frame 21 in the non-overlapping region.

As the gaze level, the gaze level may be determined from the trajectory of the line of sight. For example, a gaze region at which the user will gaze may be specified from the trajectory of the line of sight, and the gaze level may be changed according to the distance from the center of gravity of the gaze region. The degree of change (how to change the display form) may be determined according to the distance from the center of gravity of the gaze region without using the gaze level.

In a case where the gaze level is a value of the distribution described in the embodiment, the gaze level may be scaled such that the maximum value of the gaze level corresponds to the maximum transmittance of the AF frame. A table of transmittances corresponding to gaze levels may be provided, and the transmittance of the AF frame may be determined in accordance with the table.

Furthermore, in the plurality of display examples described above, processing of forming a display shape and the like similar to those of the AF frame in the overlapping region for the AF frame in the gaze region in the non-overlapping region may be performed.

The gaze region is not limited to the current gaze region, and may be a region including a region that is predicted on the basis of a movement vector based on the trajectory of the gaze and at which the user will gaze.

In the processing according to the above-described embodiments, processing based on machine learning, that is, processing using a learning model obtained by learning performed in advance may be performed.

It is sufficient if the superimposition information display region is a region where the superimposition information is displayed. The superimposition information display region may be a display region where other information of the superimposition information is displayed.

The display image generation unit may determine whether or not to perform the line-of-sight information correspondence display image generation processing according to each of a plurality of stages of a user operation on the imaging apparatus. Examples of the plurality of stages include a stage from the S0 state to the S1 state and the AF-ON in the S1 state. The line-of-sight information correspondence display image generation processing may be performed in the stage from the S0 state to the S1 state. The AF frame may be displayed in the normal display mode without performing the line-of-sight information correspondence display image generation processing in the stage of the AF-ON in the S1 state.

The configurations, methods, steps, shapes, materials, numerical values, and the like described in the above-described embodiments and modifications are merely examples, and configurations, methods, steps, shapes, materials, numerical values, and the like different from those described above may be used as necessary, or the configurations, methods, steps, shapes, materials, numerical values, and the like described in the above-described embodiments and modifications may be replaced with known ones. Furthermore, the configurations, methods, steps, shapes, materials, numerical values, and the like in the embodiments and the modifications can be combined with each other within a range in which no technical contradiction occurs.

Note that the contents of the present disclosure are not to be construed as being limited by the effects exemplified in the present specification.

The present disclosure can also adopt the following configurations.

(1)

An imaging apparatus including
a display image generation unit that performs, on the basis of a superimposition information display region for displaying superimposition information and a gaze region specified on the basis of line-of-sight information, line-of-sight correspondence display image generation processing of generating a display image in which the superimposition information and a captured image are superimposed.

(2)

The imaging apparatus according to (1), in which
the line-of-sight correspondence display image generation processing is processing of generating the display image on the basis of an overlapping state between the superimposition information display region and the gaze region.

(3)

The imaging apparatus according to (2), in which
the line-of-sight correspondence display image generation processing is processing of generating the display image according to whether or not the superimposition information display region and the gaze region overlap each other.

(4)

The imaging apparatus according to (3), in which
the line-of-sight correspondence display image generation processing is processing of performing overlapping correspondence display image generation processing in which, in a case where the superimposition information display region and the gaze region overlap each other, superimposition information in an overlapping region where the superimposition information display region and the gaze region overlap each other and superimposition information in a non-overlapping region which is another region are in different display forms in the display image.

(5)

The imaging apparatus according to (4), in which
the overlapping correspondence display image generation processing is processing of causing the superimposition information to be in different display forms in the overlapping region within the superimposition information display region and the non-overlapping region.

(6)

The imaging apparatus according to (5), in which
the overlapping correspondence display image generation processing is processing of making the display form of the superimposition information translucent in the overlapping region.

(7)

The imaging apparatus according to (5), in which
the overlapping correspondence display image generation processing is processing of making a display shape of the superimposition information different between the overlapping region within the superimposition information display region and the non-overlapping region.

(8)

The imaging apparatus according to (5), in which
the overlapping correspondence display image generation processing is processing of determining the display form of the superimposition information in the overlapping region according to a distribution of a gaze level determined on the basis of the line-of-sight information in the display image.

(9)

The imaging apparatus according to (8), in which
the overlapping correspondence display image generation processing is processing of changing the display form of the superimposition information in the overlapping region in a stepwise manner according to the distribution of the gaze level.

(10)

The imaging apparatus according to (8), in which
the overlapping correspondence display image generation processing includes, as display forms of the superimposition information in the overlapping region, a first display form of the superimposition information in a first region, a second display form of the superimposition information in a second region different from the first region and included in the overlapping region, and a third display form of the superimposition information in the non-overlapping region, and in a case where the gaze level in the first region is higher than the gaze level in the second region, a difference between the first display form and the third display form is larger than a difference between the second display form and the third display form.

(11)

The imaging apparatus according to any one of (3) to (10), in which
in a case where the superimposition information display region and the gaze region overlap each other, the display image generation unit performs overlapping correspondence display image generation processing of setting the superimposition information display region to a region that does not overlap the gaze region.

(12)

The imaging apparatus according to any one of (1) to (11), in which
the superimposition information is imaging apparatus state information indicating a state of the imaging apparatus.

(13)

The imaging apparatus according to any one of (1) to (11), in which
the superimposition information is image state information indicating a state of a captured image in the imaging apparatus.

(14)

The imaging apparatus according to (15), in which the image state information is focus information of the captured image.

(15)

The imaging apparatus according to any one of (1) to (14), in which
the display image generation unit determines whether or not to perform the line-of-sight information correspondence display image generation processing according to an imaging mode.

(16)

The imaging apparatus according to any one of (1) to (14), in which
the display image generation unit determines whether or not to perform the line-of-sight information correspondence display image generation processing according to each of a plurality of stages of a user operation on the imaging apparatus.

(17)

The imaging apparatus according to any one of (1) to (16), in which
the line-of-sight information is information indicating a distribution of a line-of-sight detection result.

(18)

The imaging apparatus according to any one of (1) to (16), in which
the line-of-sight information is information indicating a trajectory of a line-of-sight detection result.

(19)

A method of controlling an imaging apparatus, the method including causing a display image generation unit to perform, on the basis of a superimposition information display region for displaying superimposition information and a gaze region specified on the basis of line-of-sight information, line-of-sight correspondence display image generation processing of generating a display image in which the superimposition information and a captured image are superimposed.

(20)

A program for causing a computer to execute a control method of causing a display image generation unit to perform, on the basis of a superimposition information display region for displaying superimposition information and a gaze region specified on the basis of line-of-sight information, line-of-sight correspondence display image generation processing of generating a display image in which the superimposition information and a captured image are superimposed.

REFERENCE SIGNS LIST

100 Imaging apparatus
101 Control unit
101A Gaze region specifying unit
101B Display image generation unit
114 Line-of-sight detection unit

The invention claimed is:

1. An imaging apparatus, comprising:
a gaze region specifying unit configured to:
  generate line-of-sight information of a user; and
  determine, based on the generated line-of-sight information, a gaze region of a display device at which the user gazes; and
a display image generation unit configured to:
  acquire superimposition information;
  determine the gaze region overlaps a superimposition information display region of the display device;
  generate, based on the determination that the gaze region overlaps the superimposition information display region a first display image in which the superimposition information is superimposed on a captured image, wherein
    the superimposition information has a first display form in a first region of the first display image, a second display form in a second region of the first display image, and a third display form in a third region of the first display image,
    the second display form is different from the first display form, the third display form is different from the second display form, each of the first region and the second region corresponds to an overlapping region of the display device where the gaze region overlaps the superimposition information display region, the second region is different from the first region, and the third region corresponds to a non-overlapping region of the display device where the gaze region does not overlap the superimposition information display region; and control the display device to display the first display image.

2. The imaging apparatus according to claim 1, wherein the display image generation unit is further configured to generate a second display image in which the gaze region does not overlap the superimposition information display region.

3. The imaging apparatus according to claim 2, wherein the display image generation unit is further configured to set, based on the determination that the gaze region overlaps the superimposition information display region the superimposition information display region to a fourth region of the first display image that does not overlap the gaze region.

4. The imaging apparatus according to claim 1, wherein
the first display form of the superimposition information in the first region has a first transmittance, and
the second display form of the superimposition information in the second region has a second transmittance lower than the first transmittance.

5. The imaging apparatus according to claim 1, wherein a display shape of the superimposition information is different between the overlapping region and the non-overlapping region.

6. The imaging apparatus according to claim 1, wherein
the gaze region specifying unit is further configured to determine a distribution of a gaze level based on the generated line-of-sight information, and
the first display form and the second display form of the superimposition information in the overlapping region are based on the determined distribution of the gaze level.

7. The imaging apparatus according to claim 6, wherein the display image generation unit is further configured to change, based on the determined distribution of the gaze level, the first display form and the second display form of the superimposition information in the overlapping region in a stepwise manner.

8. The imaging apparatus according to claim 6, wherein
the gaze region specifying unit is further configured to determine the gaze level in the first region is higher than the gaze level in the second region, and
the display image generation unit is further configured to generate, based on the determination that the gaze level in the first region is higher than the gaze level in the second region, the first display image in which a difference between the first display form and the third display form is larger than a difference between the second display form and the third display form.

9. The imaging apparatus according to claim 1, wherein the superimposition information includes imaging apparatus state information indicating a state of the imaging apparatus.

10. The imaging apparatus according to claim 1, wherein the superimposition information includes image state information indicating a state of the captured image in the imaging apparatus.

11. The imaging apparatus according to claim 10, wherein the image state information includes focus information of the captured image.

12. The imaging apparatus according to claim 1, wherein the display image generation unit is further configured to generate the first display image based on an imaging mode of the imaging apparatus.

13. The imaging apparatus according to claim 1, wherein the display image generation unit is further configured to generate the first display image based on a stage of a plurality of stages of a user operation on the imaging apparatus.

14. The imaging apparatus according to claim 1, wherein the line-of-sight information indicates a distribution of a line-of-sight detection result.

15. The imaging apparatus according to claim 1, wherein the line-of-sight information indicates a trajectory of a line-of-sight detection result.

16. A method of controlling an imaging apparatus, the method comprising:

generating line-of-sight information of a user;

determining, based on the generated line-of-sight information, a gaze region of a display device at which the user gazes;

acquiring superimposition information;

determining the gaze region overlaps a superimposition information display region of the display device;

generating, based on the determination that the gaze region overlaps the superimposition information display region a display image in which the superimposition information is superimposed on a captured image, wherein the superimposition information has a first display form in a first region of the display image, a second display form in a second region of the display image, and a third display form in a third region of the display image, the second display form is different from the first display form, the third display form is different from the second display form, each of the first region and the second region corresponds to an overlapping region of the display device where the gaze region overlaps the superimposition information display region, the second region is different from the first region, and the third region corresponds to a non-overlapping region of the display device where the gaze region does not overlap the superimposition information display region; and controlling the display device to display the display image.

17. A non-transitory computer-readable medium having stored thereon, computer-executable instructions which, when executed by a processor, cause the processor to execute operations, the operations comprising:

generating line-of-sight information of a user;

determining, based on the generated line-of-sight information, a gaze region of a display device at which the user gazes;

acquiring superimposition information;

determining the gaze region overlaps a superimposition information display region of the display device;

generating, based on the determination that the gaze region overlaps the superimposition information display region a display image in which the superimposition information is superimposed on a captured image, wherein the superimposition information has a first display form in a first region of the display image, a second display form in a second region of the display image, and a third display form in a third region of the display image, the second display form is different from the first display form, the third display form is different from the second display form, each of the first region and the second region corresponds to an overlapping region of the display device where the gaze region overlaps the superimposition information display region, the second region is different from the first region, and the third region corresponds to a non-overlapping region of the display device where the gaze region does not overlap the superimposition information display region; and controlling the display device to display the display image.

* * * * *